(12) United States Patent
McDonald et al.

(10) Patent No.: US 6,778,829 B1
(45) Date of Patent: Aug. 17, 2004

(54) METHOD FOR INDICATING UNUSABLE SITES TO COMMUNICATION UNITS IN A COMMUNICATION SYSTEM

(75) Inventors: Daniel J. McDonald, Cary, IL (US); Robert A. Biggs, Evanston, IL (US)

(73) Assignee: Motorola, Inc., Schaumburg, IL (US)

( * ) Notice: Subject to any disclaimer, the term of this patent is extended or adjusted under 35 U.S.C. 154(b) by 442 days.

(21) Appl. No.: 09/586,212

(22) Filed: Jun. 2, 2000

(51) Int. Cl.[7] .................................................. H04Q 7/20
(52) U.S. Cl. ............................ 455/435.1; 455/8; 455/9; 455/435.2; 455/519; 455/525
(58) Field of Search ................................ 455/423, 67.1, 455/518, 524, 525, 8, 69, 519, 520, 435.1–3, 9, 436, 424, 425

(56) References Cited

U.S. PATENT DOCUMENTS

| | | | | |
|---|---|---|---|---|
| 6,038,444 A | * | 3/2000 | Schipper et al. | 455/421 |
| 6,119,017 A | * | 9/2000 | Cassidy et al. | 455/518 |
| 6,138,019 A | * | 10/2000 | Trompower et al. | 455/436 |
| 6,151,501 A | * | 11/2000 | Belkin et al. | 455/436 |
| 6,292,672 B1 | * | 9/2001 | Chavez, Jr. | 455/519 |
| 6,349,206 B1 | * | 2/2002 | Reichelt et al. | 455/421 |

\* cited by examiner

Primary Examiner—William Trost
Assistant Examiner—Stephen D'Agosta
(74) Attorney, Agent, or Firm—Susan L. Lukasik; Terri S. Hughes; Indira Saladi (57) ABSTRACT

From an unusable site, one or more communication units selects a usable site, thereby reducing missed communications. First, a manager determines (201, 401, 601) that a site is unusable for a predetermined set of communication unit(s). The predetermined set of communication units may include one or more individual communication units or communication units that are affiliated with a particular talkgroup at a particular time. A zone controller (104) identifies (205, 405, 605) any communication units from the set that are registered at the unusable site. The zone controller sends (207, 407, 607) a message to the identified units to assist them in leaving the site. The communication units search (303, 505, 709) the near sites for usability and register (307, 515, 713) at new usable sites. An algorithm is provided to stagger registration by communication units at usable sites.

23 Claims, 6 Drawing Sheets

METHOD FOR INDICATING UNUSABLE SITES TO COMMUNICATION UNITS IN A COMMUNICATION SYSTEM

FIELD OF THE INVENTION

This invention relates to communication systems, including but not limited to indicating unusable sites in a communication system to communication units.

BACKGROUND OF THE INVENTION

Wide-area dispatch communication systems are known. Commercial examples of such systems include SMARTZONE™ and OMNILINK™ systems available from Motorola, Inc. In these systems, multiple base sites are geographically distributed over a wide-area to provide over-the-air communications for communication units (e.g., transmit-only, receive-only, and receive and transmit units; vehicle-mounted or portable communication units, such as in a land mobile system, and communication unit/telephones in a cellular system) travelling in the area. The base sites are connected via a communication path to a zone controller that performs call control and mobility management for communication units and talkgroups in the system. Each site provides one or more communication resources, including RF resources such as narrow band frequency modulated communication resources, time division multiplex slots, frequency pairs, and so forth. A zone manager is operably coupled to the zone controller in the system to configure system parameters, physical device configuration, and communication unit, and talkgroup attributes. Talkgroups are groupings of communication units that wish to intercommunicate.

In existing wide-area dispatch systems, a base site may be unusable for a communication unit or a talkgroup for various reasons. A site may be marked as unusable for a communication unit or talkgroup to reduce the call traffic load at the site. A site may be marked as unusable by entering unusable site configuration information at the zone manager. The zone manager then passes the configuration information to the zone controller that keeps track of usable site information for both communication units and talkgroups. Marking a site unusable makes the site immediately unusable by the affected communication units and talkgroups.

If a site is marked unusable for a communication unit, the communication unit is unable to participate in any individual services such as private calls (non-talkgroup) or telephone interconnect calls. While a site is marked as unusable for a particular talkgroup, calls involving that talkgroup are not allowed at that site. For example, if a talkgroup call request is received from the unusable site, the request will be denied by the zone controller. Similarly, if a talkgroup call is granted from another site involving the talkgroup, the unusable site will not receive the audio associated with the call. If a communication unit roams into an unusable site and attempts to register, its registration request will be denied and the communication unit is given a message to leave the site, thereby preventing the communication unit from registering at a site that is unusable.

Unfortunately, a communication unit is not notified when a site is made unusable, even if the communication unit is presently registered at the unusable site. A communication unit is made aware that it is at an unusable site only indirectly in response to actions taken by the communication unit. For example, if the communication unit attempts a call at the unusable site, then the communication unit, in response to being denied, will first attempt to find a usable site. Also, the communication unit may roam from an unusable site to a usable site as a part of normal mobility. These methods of changing to a usable site from an unusable site are sporadic and can cause a communication unit to unknowingly miss calls while registered at an unusable site.

Accordingly, there is a need for a method to notify communication units of an unusable site so that units can select a usable site to prevent the communication unit from missing calls.

DESCRIPTION OF A PREFERRED EMBODIMENT

The following describes an apparatus for and method of notifying communication units that they are registered at an unusable site. As a result, the communication units may find a usable, or available, site elsewhere, such that the communication units do not miss calls or call segments as a result of a site becoming unusable. A site may marked, declared, or made unusable, or unavailable, by a user or system manager for a communication unit or a talkgroup, or may become unusable or unavailable for various reasons, such as equipment failure, planned maintenance, local disturbance (e.g., fire, earthquake, bombing), excess traffic or load, unavailability, and so forth. For the case where a site is made unusable for a particular communication unit, the communication unit is sent a message indicating that the site is unusable for that communication unit. The communication unit then selects a usable site in response to the message. For the case where a site is made unusable for a particular talkgroup, the communication units affiliated with the talkgroup at the site are identified. The identified communication units are sent a message indicating that the talkgroup is no longer usable at the site. To prevent a system overload in registration requests due to many communication units simultaneously changing to another site from an unusable site, an algorithm is provided for affected communication units to randomly delay registration based on parameters sent with the message. Preferably, sites are monitored to determine if the identified communication units have registered at other usable sites. Corrective action is provided for should an identified communication unit fail to register at another site.

Figure 1:
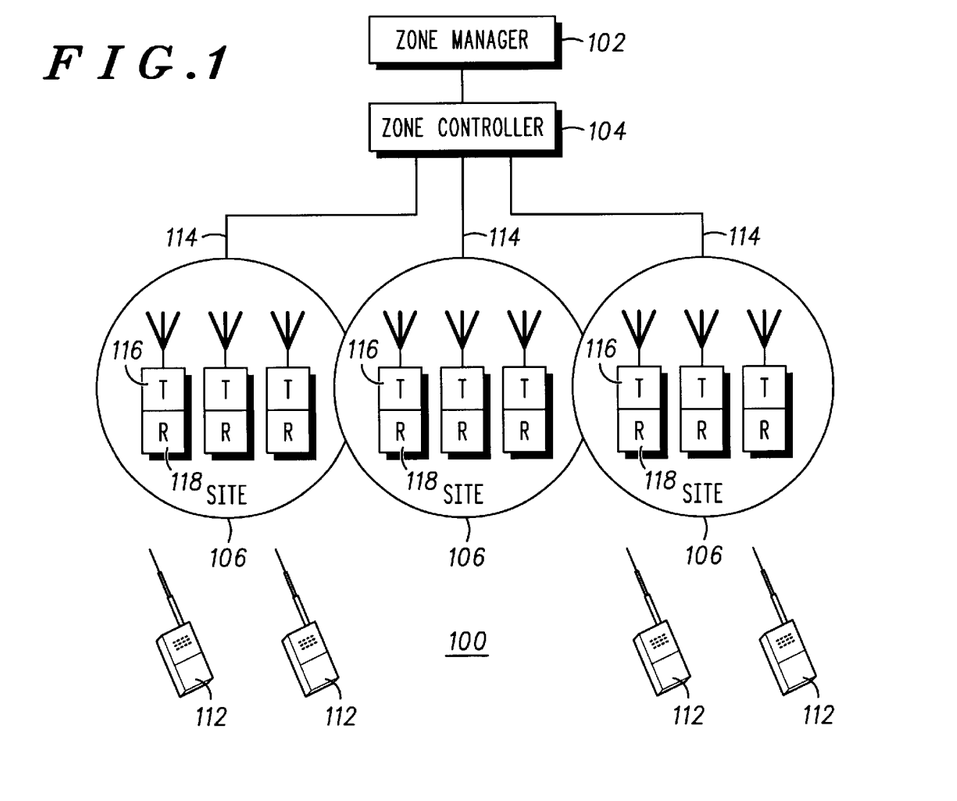
FIG. 1 is a block diagram of a communication system in accordance with the present invention.

FIG. 1 is a block diagram of a communication system 100 in accordance with the present invention. In the preferred embodiment, the system 100 is a radio frequency (RF) communication system that includes a zone manager 102, a zone controller 104, a plurality of base sites 106, and a plurality of communication units 112. In the preferred embodiment, the zone manager 102 configures system parameters, physical device configuration, and communication unit and talkgroup attributes, including priorities. In the preferred embodiment, the zone controller 104 performs call control and mobility management for communication units and talkgroups on the system. The zone manager 102 is operably coupled to the zone controller 104 for communication of configuration and control information between the two. In the preferred embodiment, the zone controller 104 is operably coupled to a plurality of the sites 106, 108, and 110 via communication links 114. In accordance with the present invention, the zone manager 102 and zone controller 104 alert communication units 112 if a site at which the communication unit is located is made unusable for that communication unit. The affected communication units 112 take action in accordance with the present invention to register at a usable site.

In the preferred embodiment, the zone manager 102 is a processor-based apparatus that is responsible for configuring system parameters such as physical device configuration parameters and communication unit and talkgroup attributes. In the preferred embodiment, the zone manager 102 includes an interface for a user or system manager to monitor and configure the system. In the preferred embodiment, a user or manager may input usable site configuration information into the zone manager 102 to designate a site as usable or unusable for a communication unit or talkgroup. The zone manager 102 may also determine for various reasons, such as equipment failure, local disturbance, or planned maintenance, that a site may be designated as unusable. The zone manager 102 communicates the new configuration information to the zone controller 104.

In the preferred embodiment, the zone controller 104 is a processor-based communications apparatus that performs call control and mobility management for communication units and talkgroups in the system. In the preferred embodiment, upon receipt of the new configuration information from the zone manager 102, the zone controller 104 records the usable site change information for either communication units or talkgroups as applicable.

The sites 106 provide an interface between the zone controller 104 and the communication units 112. In the preferred embodiment, the sites 106 include transmitters 116 and receivers 118 that facilitate over-the-air communication with and between the communication units 112. In the preferred embodiment, the communication units 112 are two-way radios for audio and/or data communications. The communication units may be transmit-only, receive-only (e.g., scanners), and receive and transmit units; vehicle-mounted or portable communication units, such as those used in a land mobile system, and mobile or portable cellular phones, such as those used in a cellular system. Typically, each communication unit 112 registers at one of the sites 106 to aid in the transmission and/or reception of calls. The sites 106 are generally selected based on proximity of the communication unit to the site. Generally, overlap in the coverage between sites provides communication units a choice of site.

FIG. 2 through FIG. 7 are flowcharts illustrating preferred methods in accordance with the present invention and are described below with reference to the preferred embodiment shown in FIG. 1.

Figure 2:
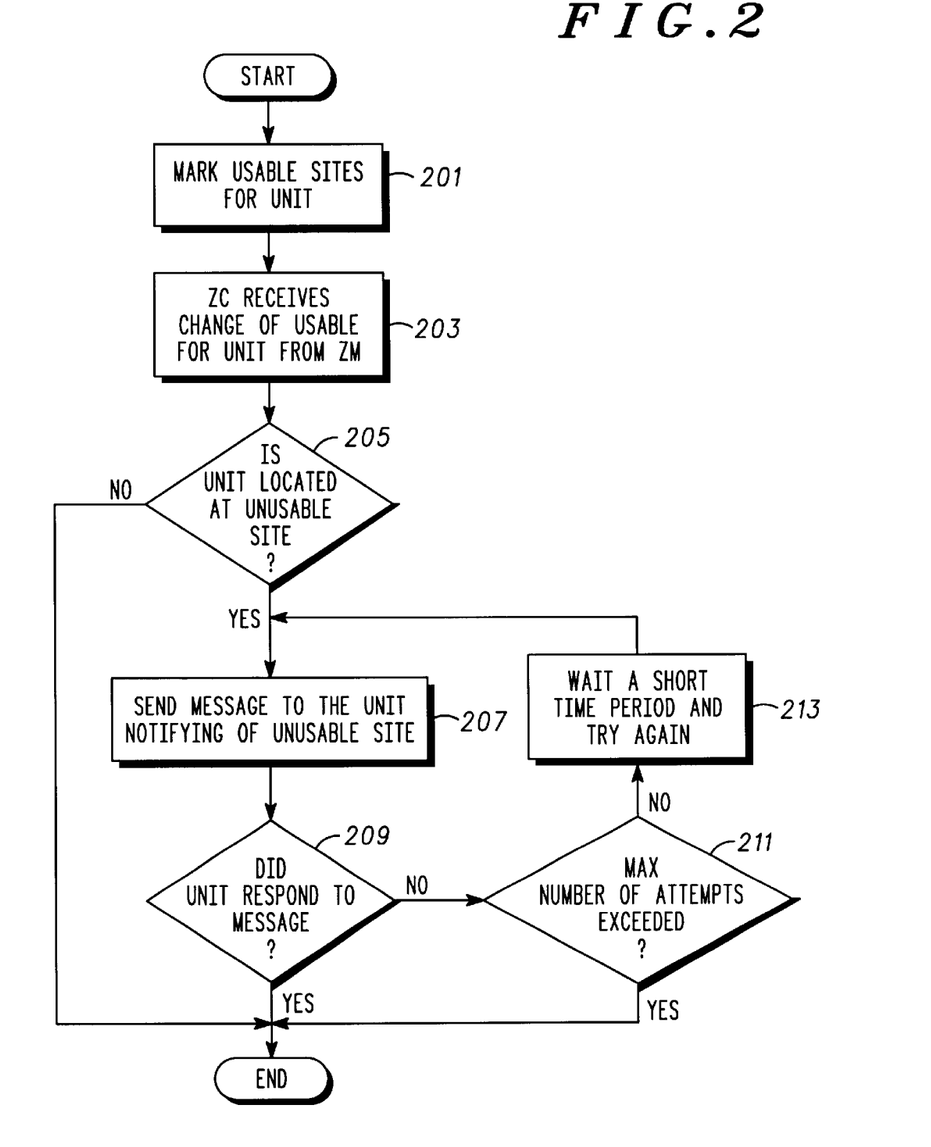
FIG. 2 is a flowchart illustrating a method for notifying an individual communication unit of an unusable site in accordance with the present invention.

FIG. 2 is a flowchart illustrating a method for notifying an individual communication unit of an unusable site in accordance with the present invention. A site is marked 201 as unusable for a particular communication unit. This marking is accomplished in the preferred embodiment by entering usable site change configuration information into the zone manager (ZM) 102, either manually, by a user or system manager, or automatically, e.g., the zone controller 104, zone manager 102, or other system device determines that a site is unusable for various reasons, such as equipment failure, planned maintenance, local disturbance (e.g., fire, earthquake, bombing), unavailability, and so forth. In the preferred embodiment, the zone controller (ZC) 104 receives 203 the usable site change information from the zone manager 102 as appropriate. The zone controller 104 determines 205 whether any communication unit is registered at the unusable site. If a communication unit(s) is identified as registered at the unusable site, then zone controller 104 sends 207 a message that is communicated from a site 106 to the identified communication unit(s) 112 and notifying them that the site is unusable. In the preferred embodiment, the message includes an indication that the site is unusable, but may also include an additional indication for the communication unit to find a usable site. The communication unit may be programmed to interpret a message indicating an unusable site as an indication to find another usable site. Alternatively, the communication unit may attempt to find another site only if directed to do so. The preferred steps taken by a communication unit in response to receiving such a message are discussed below with respect to FIG. 3. If at step 205 no communication unit is identified as being affected by the site becoming unusable, then no other action is taken and the process ends.

After sending the notification message to one or more communication units, the zone controller 104 checks 209 to see if the communication unit has responded to the message from step 207. In the preferred embodiment, the checking is performed by determining whether the communication unit registered at a usable site. If the zone controller 104 determines that the communication unit did not register at a usable site, action is taken in the preferred embodiment by continuing the process with step 211. The zone controller 104 reattempts, up to a maximum number of times, to send the notification message to the communication unit 112. The zone controller 104 determines 211 whether the maximum number of attempts to send the notification message has been reached. If the maximum number of attempts has not been exceeded, then the zone controller 104 waits 213 for a short period of time, and again sends the notification message to the communication unit 112, thereby repeating the steps 207, 209, 211, and 213 until the communication unit registers at a usable site or until the maximum number of attempts is reached. In the preferred embodiment, the process ends after the maximum number of attempts is reached at step 211 or after the communication unit registers at a usable site.

Figure 3:
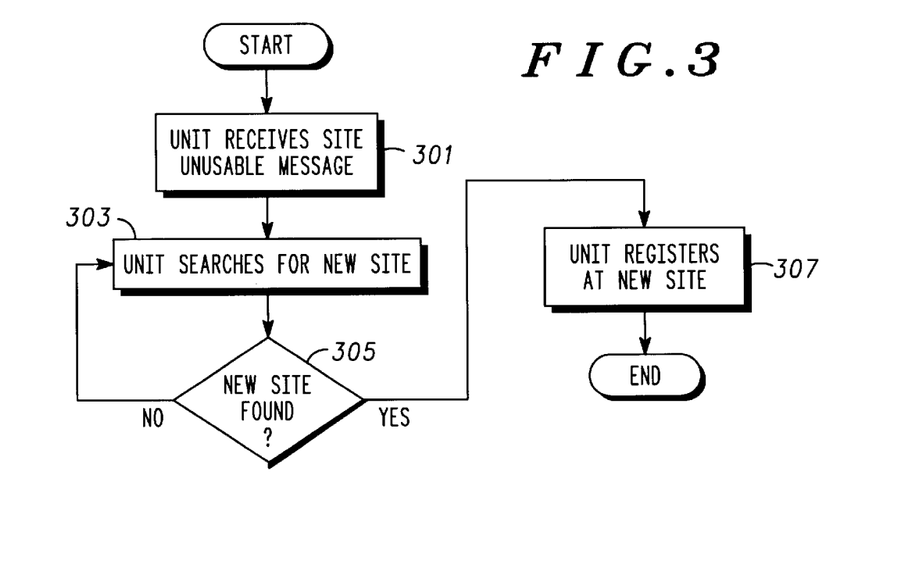
FIG. 3 is a flowchart illustrating a method employed in a communication unit for changing from an unusable site in accordance with the present invention.

FIG. 3 illustrates the preferred steps taken by a communication unit in response to receiving the notification message from the zone controller 104 at step 207. The communication unit 112 receives 301 from the zone controller 104 the notification message indicating that the unit's present site is now unusable. The communication unit searches 303 for a new site until a new site is located. In the preferred embodiment, the process of searching involves site searching algorithm(s) as known in the art. After the communication unit finds 305 a new site, the communication unit registers 307 at the new site, and the process ends. In contrast to the prior art, in the present invention, as illustrated in FIG. 2 and FIG. 3, a communication unit receives an affirmative notification that its current site is no longer usable. The communication unit then locates and registers at a usable site, thereby avoiding unknowingly missing calls.

Figure 4:
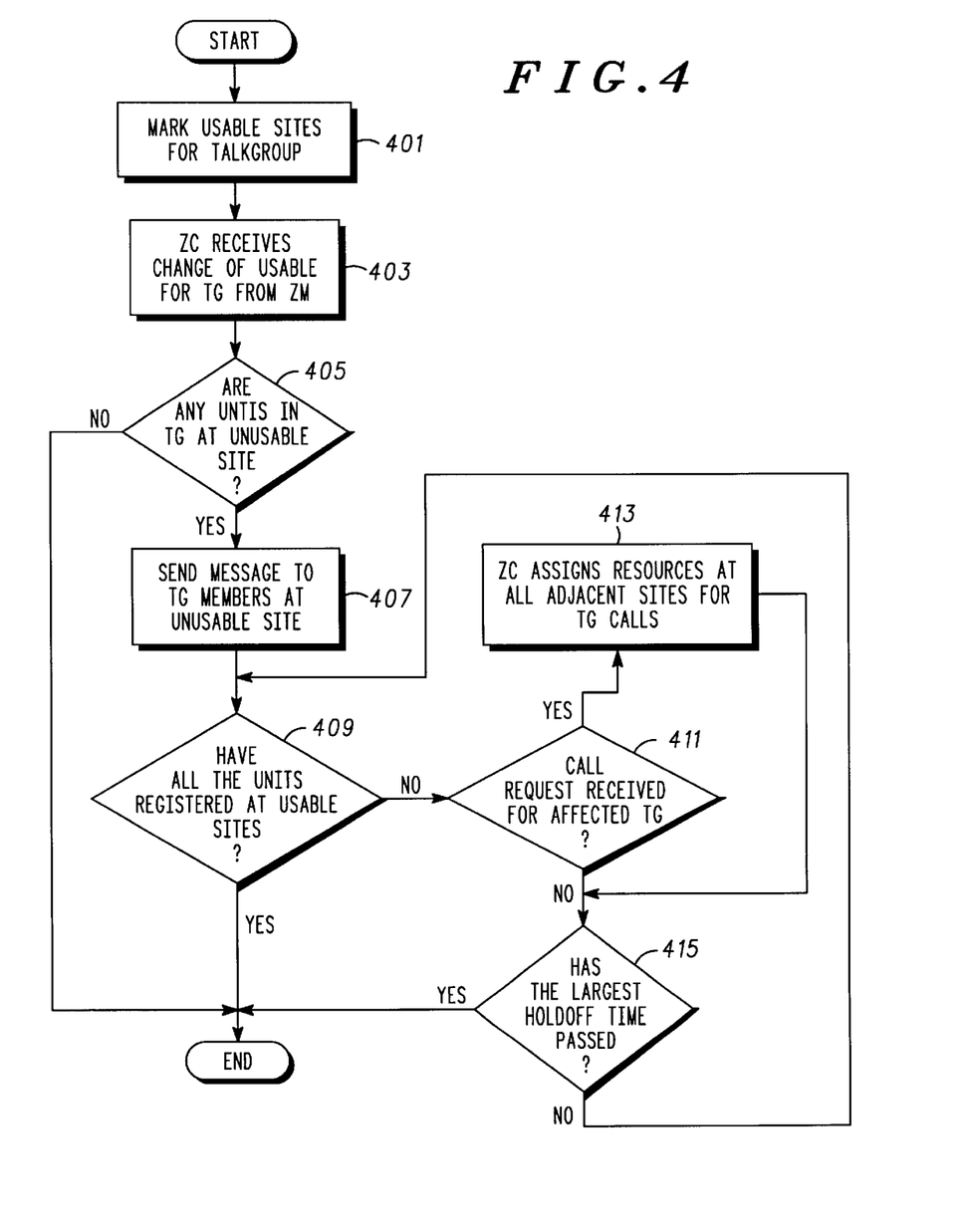
FIG. 4 is a flowchart illustrating a method for notifying communication units that are affiliated with a talkgroup of an unusable site in accordance with the present invention.

FIG. 4 is a flowchart illustrating a method for notifying communication units affiliated with a talkgroup (TG) of an unusable site in accordance with the present invention. A site is marked 401 as unusable for a particular talkgroup. This marking is accomplished in the preferred embodiment by entering usable site change configuration information into the zone manager (ZM) 102, either manually, by a user or system manager, or automatically, e.g., the zone controller 104, zone manager 102, or other system device determines that a site is unusable for various reasons, such as equipment failure, planned maintenance, local disturbance (e.g., fire, earthquake, bombing), unavailability, and so forth. In the preferred embodiment, the zone controller (ZC) 104 receives 403 the usable site change information from the zone manager 102 as appropriate. The zone controller 104 determines 405 whether any communication units affiliated with the talkgroup are registered at the unusable site. If one or more communication units are identified, the zone controller 104 sends 407 a notification message to the talkgroup members at the site, which message indicates that the site is unusable for that talkgroup. In the preferred embodiment, the message includes a maximum amount of time that the communication unit should wait before registering at the new site. This time is preferably based on the number of communication units affiliated with the talkgroup at the unusable site. In the preferred embodiment, the maximum wait time is one second times the number of communication units that are affected. The number of available usable sites nearby may alternatively be considered in determining a maximum wait time. The maximum wait time is used to orderly register communication units at usable sites. The steps taken by affected communication units in response to a notification message are discussed below with respect to FIG. 5.

After sending the message indicating an unusable site to the communication units at step 407, the zone controller 104 monitors 409, in the preferred embodiment, the affected communication units to determine if all the affected communication units have registered at usable sites. If all the affected communication units are registered at usable sites, the process ends If at step 409 the affected communication units are not all registered at other sites, and a call request is received at step 411 for the affected talkgroup, the zone controller 104, in the preferred embodiment, assigns 413 call resources for the affected talkgroup at all sites adjacent to the unusable site to prevent any missed calls or call segments due to a delayed registration. In the preferred embodiment, additional call resources for the affected talkgroup are maintained at adjacent sites until the maximum wait time or hold-off time expires. In the preferred embodiment, at the end of the maximum wait time or hold-off time, the zone controller 104 may assume 415 all affected communication units have registered at a usable site. Alternatively, the zone controller 104 may issue additional notification messages to communication units.

Figure 5:
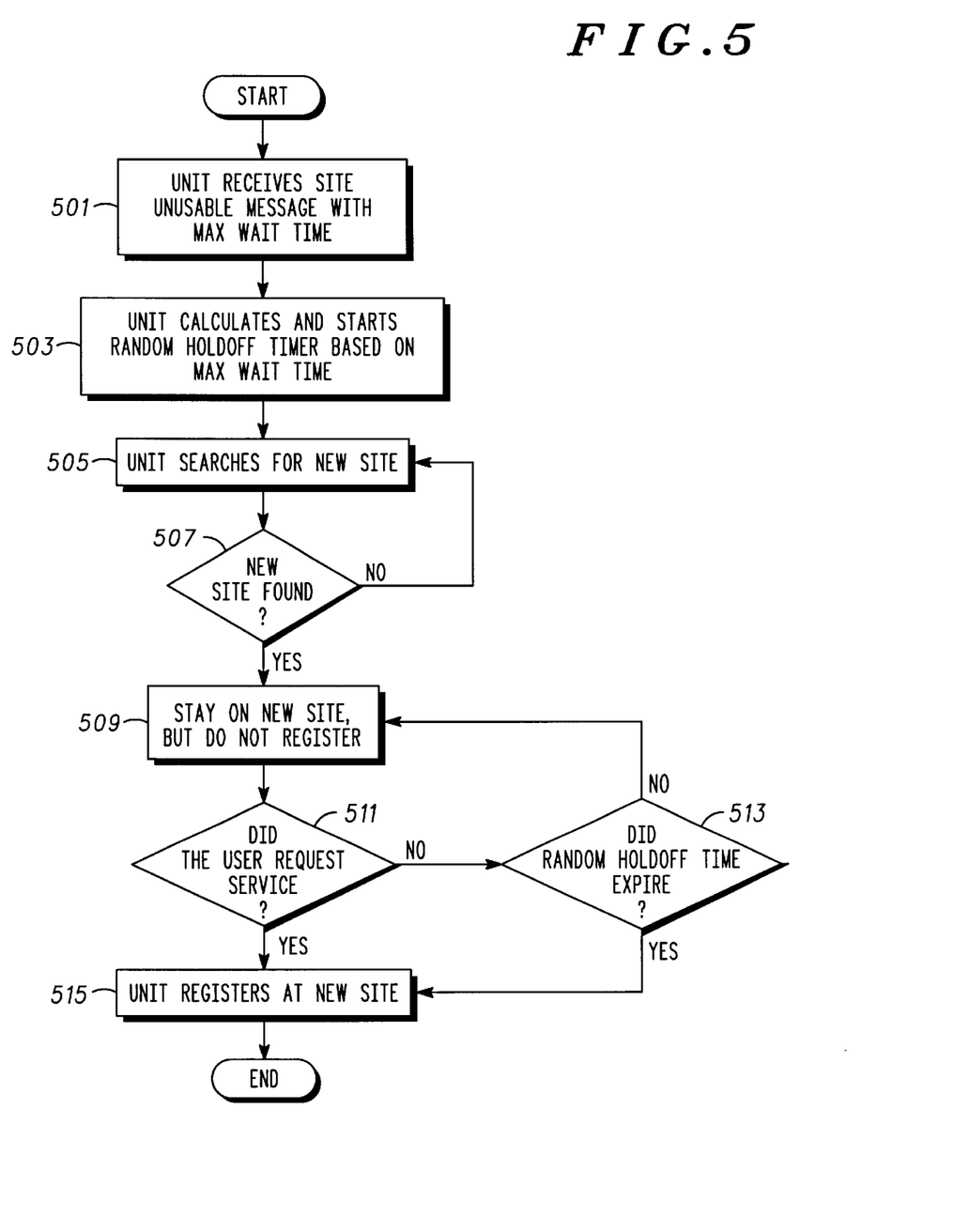
FIG. 5 is a flowchart illustrating a method employed in communication units that are affiliated with a talkgroup for changing from an unusable site in accordance with the present invention.

FIG. 5 illustrates the preferred steps taken by communication units in response to receiving the notification message from the zone controller 104 at step 407. The communication unit receives 501 from the zone controller 104 the message indicating that the talkgroup is unusable at its present site. In the preferred embodiment, the message includes a maximum wait time, as described above. In the preferred embodiment, the communication unit determines or calculates 503 a registration time that is randomly chosen as a time between zero and the maximum wait time received. In the preferred embodiment, the registration time is loaded into a hold-off timer that expires at the registration time.

The communication unit searches for a new site until a new site at step 505. After a new site is found 507, the communication unit temporarily withholds 509 registration. In the preferred embodiment, registration is withheld until a user of the communication unit requests 511 service, for example, an individual or group call request, or until the hold-off timer expires 513, indicating that the randomly selected registration time is reached. After the occurrence of the registration time or at a user request, the communication unit registers 515 at the new site.

By virtue of the method described above with respect to FIG. 4 and FIG. 5 communication units affiliated with a talkgroup receive an affirmative indication to change from an unusable site. Registration time is randomly delayed to prevent simultaneous registration request, which might have adverse effects on the system. Call resources, such as communications channels, are established for the affected talkgroup call requests at sites adjacent to the site made unusable. These call resources are made available for communication units using, but not registered at, the adjacent sites.

Figure 6:
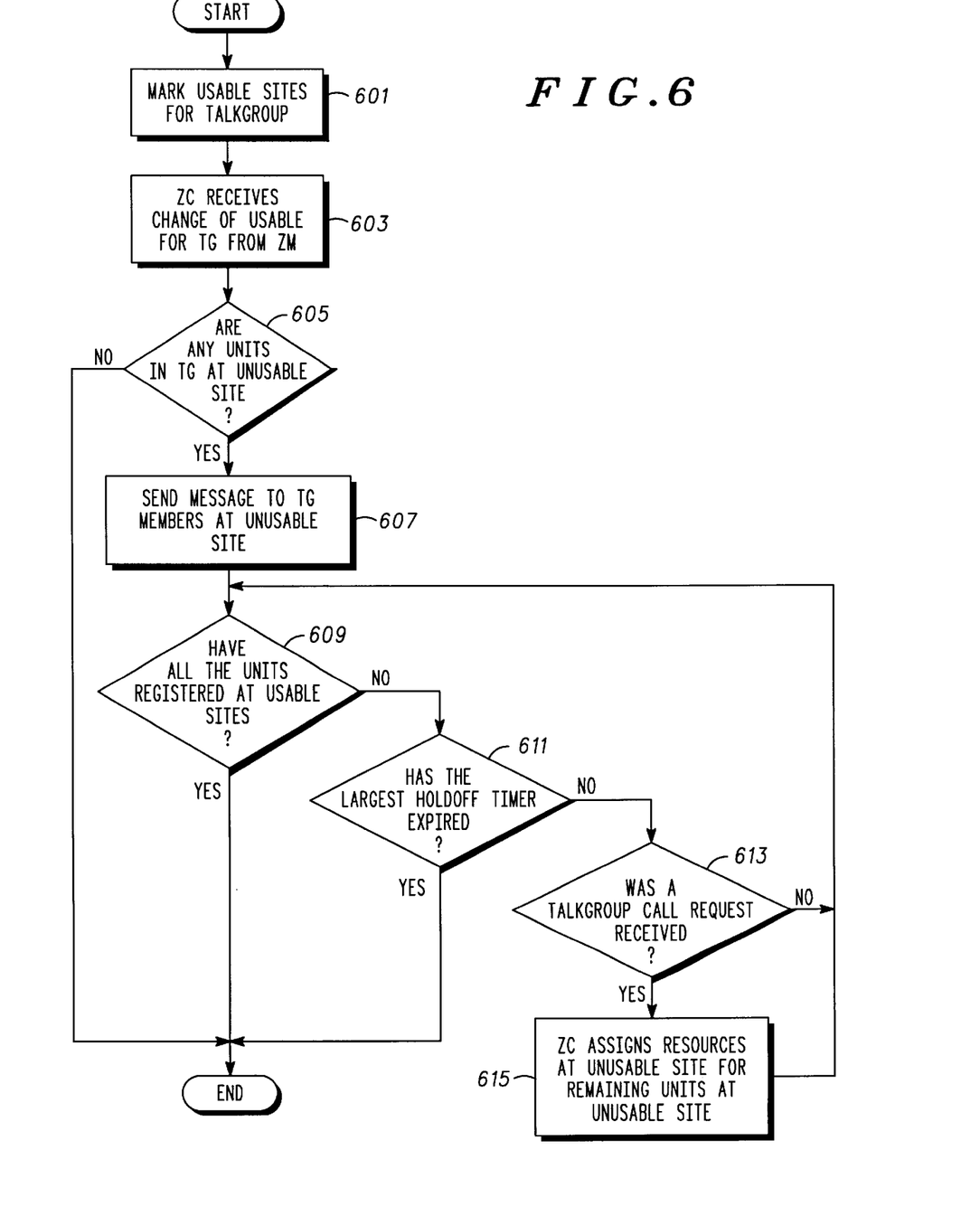
FIG. 6 is a flowchart illustrating an alternative method for notifying communication units that are affiliated with a talkgroup of an unusable site in accordance with the present invention.

FIG. 6 is a flowchart illustrating an alternate method for notifying communication units affiliated with a talkgroup of an unusable site in accordance with the present invention. In particular, as discussed below, in contrast to the method illustrated with respect to FIG. 4 and FIG. 5, a site is not made immediately unusable by communication units, but is made unusable only after affected communication units have an opportunity to register at a usable site. As in FIG. 4, a site is marked 601 as unusable for a particular talkgroup. This marking is accomplished in the preferred embodiment by entering usable site change configuration information into the zone manager (ZM) 102, either manually, by a user or system manager, or automatically, e.g., the zone controller 104, zone manager 102, or other system device determines that a site is unusable for various reasons, such as equipment failure, planned maintenance, local disturbance (e.g., fire, earthquake, bombing), unavailability, and so forth. In the preferred embodiment, the zone controller (ZC) 104 receives 603 the usable site change information from the zone manager 102 as appropriate. The zone controller 104 determines 605 whether any communication units affiliated with the talkgroup are registered at the unusable site. If one or more communication units are identified, the zone controller 104 sends 607 a notification message to the talkgroup, which message indicates that the site is unusable for that talkgroup. The message preferably includes the maximum wait time, as described above with respect to FIG. 4. The steps taken by a communication unit in response to the notification message are discussed below with respect to FIG. 7.

After the notification message is sent to the affected communication units, the zone controller 104 determines 609 if all the affected communication units have registered at usable sites. If at step 609 all affected communication units are registered at usable sites, the process ends. If not all communication units have registered at a usable site, the zone controller 104 determines 611 whether the maximum wait time has passed, as indicated by the expiration of a hold-off timer in the preferred embodiment. If the maximum wait time has passed, in the preferred embodiment, the zone controller 104 may assume all affected communication units have registered at usable sites. Alternatively, the zone controller 104 may issue additional notification messages to communication units for any communication units remaining at the unusable site at the end of the maximum wait time. If the maximum wait time has not been exceeded at step 611, the zone controller 104 determines 613 whether a talkgroup call request has been made. If at step 609 the affected communication units are not all registered at other sites, and a call request is received at step 611 for the affected talkgroup, the zone controller 104, in the preferred embodiment, assigns 615 call resources for the affected talkgroup at the unusable site to prevent any missed calls or call segments due to a delayed registration. In the preferred embodiment, steps 609, 611, 613, and, if necessary, 615 are repeated until all affected communication units are registered at usable sites or until the maximum wait time expires.

Figure 7:
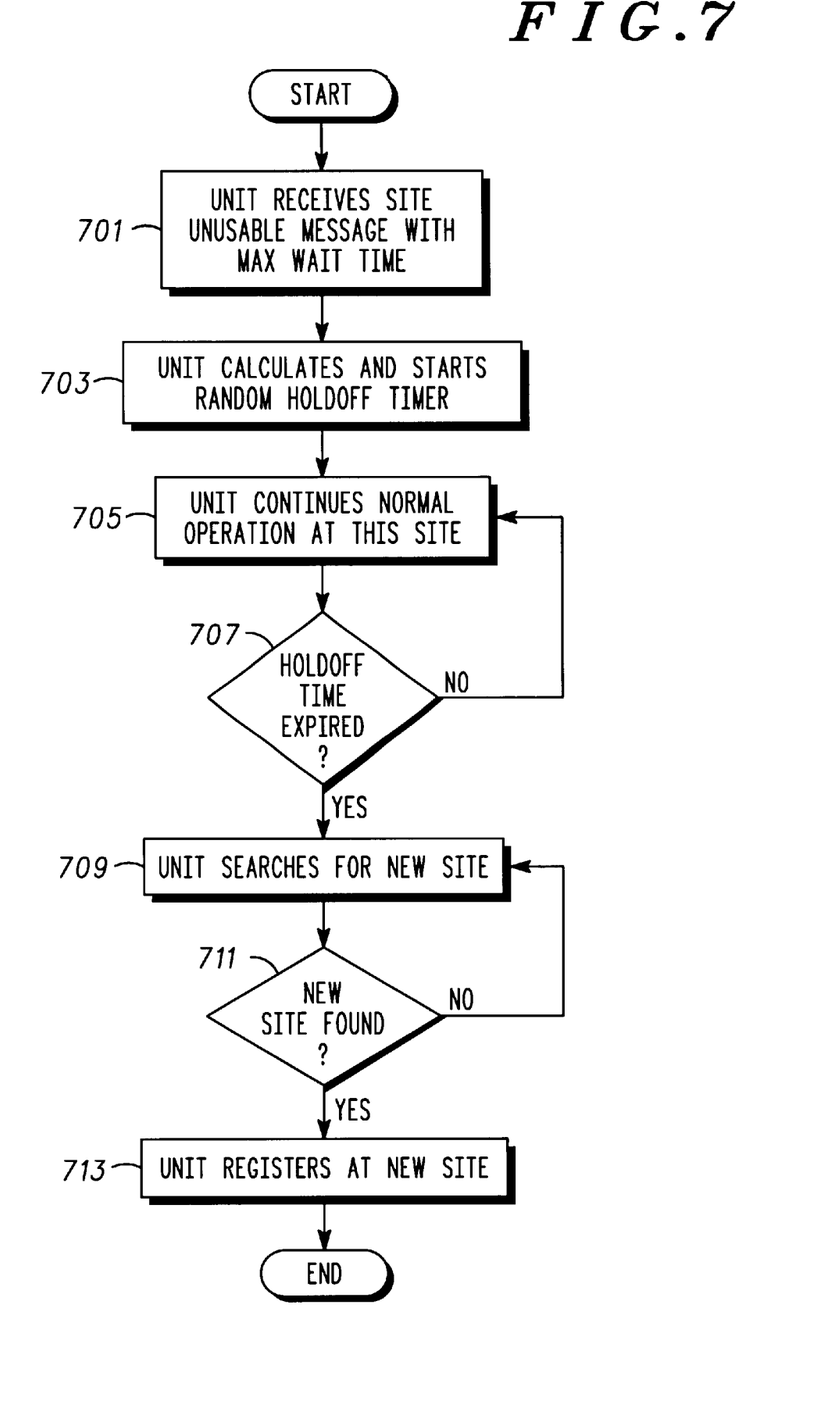
FIG. 7 is a flowchart illustrating an alternative method employed in communication units that are affiliated with a talkgroup for changing from an unusable site in accordance with the present invention.

FIG. 7 illustrates the preferred steps taken by communication units in response to receiving the notification message from the zone controller 104 in step 607. In contrast to the method illustrated in FIG. 5 and discussed above, rather than immediately finding a new site and delaying registration, communication units, in accordance with the method of FIG. 7, delay in searching for a new site until a random registration time, and upon finding a new site, the communication units immediately register at the new site. The communication unit receives 701 the notification message from the zone controller 104. In the preferred embodiment, the message includes a maximum wait time. The communication unit determines or calculates 703 a registration time by randomly selecting a time between zero and the maximum wait time. In the preferred embodiment, the registration time is loaded in a hold-off timer that expires at the registration time. The communication unit remains 705 at the unusable site and continues its normal operation at this site. At step 707, the communication unit determines if the hold-off timer has expired, indicating the randomly selected registration time occurred. If the registration time has occurred, then the communication unit searches 709 for a usable site, as previously described. After the communication unit finds 711 a new site, the communication unit registers 713 at the new site, preferably without delay, and the process ends.

As an alternative to the communication units randomly selecting registration times as described above with respect to FIG. 5 and FIG. 7, the zone controller 104 may randomly select a registration time for each communication unit that was registered at an unusable site. The zone controller 104 separately sends messages directed to each communication unit at the selected registration time to indicate to the communication unit to take immediate action, for example, register at a usable site or find and register at a new site.

The present invention greatly enhances the operation of existing communication systems, particularly RF systems. In particular, missed calls are reduced by affirmatively notifying a communication unit if a site at which it is located is made unusable for the communication unit or the communication unit's affiliated talkgroup. System overload due to simultaneous registration of displaced communication units is prevented by random registration times selected by communication units. During a period while displaced communication units are in the process of registering at usable sites, call resources are selectively allocated to prevent missed calls.

Whereas the present invention has been described with respect to specific embodiments thereof, it will be understood that various changes and modifications will be suggested to one skilled in the art and it is intended that the invention encompass such changes and modifications as fall within the scope of the appended claims. The present invention may be embodied in other specific forms without departing from its spirit or essential characteristics. The described embodiments are to be considered in all respects only as illustrative and not restrictive. The scope of the invention is, therefore, indicated by the appended claims rather than by the. foregoing description. All changes that come within the meaning and range of equivalency of the claims are to be embraced within their scope.

What is claimed is:

1. A method comprising the steps of:

making a site usable for a predetermined set of communication units;

identifying at least one communication unit of the predetermined set of communication units that is currently registered at the site;

sending a message to the at least one communication unit that is currently registered at the site, the message comprising an indication to find a usable site; and where the communication unit fails to receive the message:

determining whether a maximum number of attempts to send the message to the communication unit has been exceeded;

if the maximum number of attempts to send the message has not been exceeded, then pausing for a predetermined time before sending the message to the communication unit again; and repeating the sending, determining, and passing steps until the maximum number of attempts to send the message is reached or until the communication unit registers at the usable site.

2. The method of claim 1, further comprising the steps of:

receiving, by the communication unit, the message;

finding the usable site; and registering, by the communication unit, at the usable site.

3. The method of claim 1, wherein the message includes a maximum amount of time that the communication unit should wait before registering at the usable site.

4. The method of claim 3, wherein the maximum amount of time is based on a number of usable sites and a number of communication units of the predetermined set of communication units registered at the site.

5. The method of claim 3, further comprising the steps of:

the communication unit randomly selecting a registration time between zero and the maximum amount of time included in the message; and the communication unit registering at the usable site at the registration time.

6. The method of claim 1, wherein after the sending step, some communication units of the predetermined set of communication units remain at the site.

7. The method of claim 1, further comprising the step of assigning communication resources to near sites for the predetermined set of communication units to reduce the likelihood of missing at least a part of a call due to delayed registration.

8. The method of claim 7, wherein the step of assigning communication resources to near sites further comprises assigning communication resources to near sites for the predetermined set of communication units in response to a call to the predetermined set of communication units.

9. The method of claim 1, wherein the communication unit waits at the site until a registration time expires.

10. The method of claim 9, further comprising the step of allowing the communication unit to make calls while the communication unit waits at the site.

11. The method of claim 9, wherein the registration time is a randomly selected time between zero and a maximum amount of time included in the message.

12. The method of claim 11, wherein when the maximum amount of time has not expired, some communication units of the predetermined set of communication units remain on the site.

13. The method of claim 9, further comprising the steps of:
   determining that the registration time has expired;
   searching for the usable site; and
   registering, by the communication unit, at the usable site.

14. A method comprising the steps of:
   making a site unusable for a predetermined set of communication units;
   identifying at least one communication unit, wherein the communication unit of the predetermined set of communication units that is currently registered at the site waits at the site until a registration time expires, wherein the registration time is a randomly selected time between zero and a maximum amount of time included in a message and when the maximum amount of time has not expired, some communication units of the predetermined set of communication units remain on the site;
   sending the message to the at least one communication unit that is currently registered at the site, the message comprising an indication to find a usable site; and
   assigning communication resources to the site for the predetermined set of communication units to reduce the likelihood of missing at least a part of a call due to delayed registration.

15. The method of claim 14, wherein the step of assigning a communication resource at the site further comprises assigning a communication resource to the site for the predetermined set of communication units in response to a call to the predetermined set of communication units.

16. The method of claim 1, wherein the communication unit finds the usable site and temporarily withholds registration at the usable site.

17. The method of claim 16, further comprising the step of the communication unit registering at the usable site when a user of the communication unit requests service.

18. The method of claim 16, further comprising the step of the communication unit registering at the usable site at a registration time.

19. The method of claim 18, wherein the registration time is a randomly selected time between zero and a maximum amount of time included in the message.

20. A method comprising the steps of:
   making a site unusable for a talkgroup that includes a set of communication units that are affiliated to the talkgroup;
   identifying at least one communication unit of the talkgroup that is currently registered at the site wherein the at least one communication unit randomly selects a registration time between zero and the maximum amount of time included in the message and the at least one communication unit registering at the usable site at the registration time; and
   sending a message to the talkgroup, the message indicating to the at least one communication unit to find a usable site wherein the message includes a maximum amount of time that the at least one communication unit should wait before registering at a usable site and the maximum amount of time is based on a number of communication units of the set of communication units registered at the site.

21. The method of claim 20, further comprising the steps of:
   receiving, by the at least one communication unit, the message;
   finding the usable site; and
   registering, by the at least one communication unit, at the usable site.

22. In a communication system comprising a plurality of communication units and a plurality of sites providing communications with the plurality of communication units, a method comprising the steps of:
   making one site of the plurality of sites unusable for a selected communication unit;
   if the selected communication unit is registered at the one site, sending a message to the selected communication unit, the message indicating to the selected communication unit to find a usable site; and where the selected communication unit fails to receive the message;
   determining whether a maximum number of attempts to send the message to the selected communication unit has been exceeded;
   if the maximum number of attempts to send the message has not been exceeded, then pausing for a predetermined time before sending the message to the selected communication unit again; and
   repeating the sending, determining, and pausing steps until the maximum number of attempts to send the message is reached or until the selected communication unit registers at a usable site.

23. The method of claim 22, further comprising the steps of:
   the selected communication unit receiving the message;
   the selected communication unit finding a usable site; and
   the selected communication unit registering at the usable site.

* * * * *